US010296498B2

(12) United States Patent
Yang et al.

(10) Patent No.: US 10,296,498 B2
(45) Date of Patent: May 21, 2019

(54) COORDINATED HASH TABLE INDEXES TO FACILITATE REDUCING DATABASE RECONFIGURATION TIME

(71) Applicant: Oracle International Corporation, Redwood Shores, CA (US)

(72) Inventors: Chen Yang, Belmont, CA (US); Wilson Wai Shun Chan, San Mateo, CA (US); Tolga Yurek, Foster City, CA (US); Eugene Reddy Ho, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 289 days.

(21) Appl. No.: 15/245,005

(22) Filed: Aug. 23, 2016

(65) Prior Publication Data

US 2018/0060318 A1 Mar. 1, 2018

(51) Int. Cl.
*G06F 16/22* (2019.01)
*G06F 16/21* (2019.01)

(52) U.S. Cl.
CPC .......... *G06F 16/2255* (2019.01); *G06F 16/21* (2019.01)

(58) Field of Classification Search
CPC ......... G06F 17/30362; G06F 17/30224; G06F 17/30339; G06F 17/30864; G06F 17/30536; G06F 17/30949; G06F 17/30958; G06F 17/30327
See application file for complete search history.

(56) References Cited

U.S. PATENT DOCUMENTS

| 6,529,906 | B1 * | 3/2003 | Chan ........................ G06F 9/52 |
| 6,751,616 | B1 * | 6/2004 | Chan ................... G06F 17/3033 |
| 7,080,075 | B1 * | 7/2006 | Chan ................. G06F 17/30362 |
| 7,284,151 | B2 * | 10/2007 | Chandrasekaran ........................ G06F 17/30362 707/E17.007 |
| 7,293,011 | B1 * | 11/2007 | Bedi ................. G06F 17/30445 |

(Continued)

OTHER PUBLICATIONS

Oracle 7 Parallel Server Concepts and Administrator's Guide, "Distributed Lock Manager: Access to Resources", https://docs.oracle.com/cd/A57673_01/DOC/server/doc/SPS73/chap8.htm, Jul. 22, 2016, 9pgs.

(Continued)

*Primary Examiner* — Daniel A Kuddus
(74) *Attorney, Agent, or Firm* — Hickman Palermo Becker Bingham LLP (57) ABSTRACT

According to embodiments, reconfiguration of lock masters for a cluster of nodes is optimized using coordinated hash indexes to index into the master hash table and into local hash tables stored on the nodes of the cluster. A DBMS uses a hybrid hash index, a portion of which represents a corresponding master hash index, to index into both the master hash table and into a local hash table for a given lock. The hash index used to store lock metadata in a particular local hash table bucket, on a particular node, encodes the lock master index, for a master hash table, to which the locks in the local hash table bucket correspond. Only the portions of the local hash table on the lock master that correspond to the index of the master hash table bucket need to be scanned in order to perform needed tasks for lock master reconfiguration.

16 Claims, 6 Drawing Sheets

(56) References Cited

U.S. PATENT DOCUMENTS

| | | | |
|---|---|---|---|
| 7,962,453 B2* | 6/2011 | Chandrasekaran | ........................... G06F 17/30171 707/650 |
| 2003/0061227 A1* | 3/2003 | Baskins | ............ G06F 17/30961 |
| 2004/0243578 A1* | 12/2004 | Chan | ..................... G06F 9/5061 |
| 2005/0022047 A1* | 1/2005 | Chandrasekaran | ........................... G06F 17/30362 714/5.11 |
| 2006/0112222 A1* | 5/2006 | Barrall | .................. G06F 3/0607 711/114 |
| 2013/0185270 A1* | 7/2013 | Brower | ............. G06F 17/30362 707/704 |

OTHER PUBLICATIONS

Arup Nanda, "Smart Scans Meet Storage Indexes", Oracle Exadata: Smart Scans Meet Storage Indexes, http://www.oracle.com/technetwork/testcontent/o31exadata354069.html, last accessed on Jun. 2011, 4 pages.

\* cited by examiner

SERVER DEVICE 130

MASTER HASH TABLE 200

| 0 | 1 | 2 | 3 | 4 | 5 | 6 | 7 |
|---|---|---|---|---|---|---|---|
| 130 | 140 | 150 | 130 | 140 | 150 | 130 | 140 |

LOCAL HASH TABLE 230

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|

SERVER DEVICE 140

LOCAL HASH TABLE 240

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|

SERVER DEVICE 150

LOCAL HASH TABLE 250

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|

COORDINATED HASH TABLE INDEXES TO FACILITATE REDUCING DATABASE RECONFIGURATION TIME

CROSS-REFERENCE TO RELATED APPLICATIONS

This application is related to U.S. Pat. No. 6,272,491, titled "Method And System For Mastering Locks In A Multiple Server Database System", issued Aug. 7, 2001, the entire contents of which is hereby incorporated by reference as if fully set forth herein.

FIELD OF THE INVENTION

The present invention relates to data lock mastering and, more specifically, to coordinating hash indexes used for storing lock information for a node cluster.

BACKGROUND

The interconnected nature of today's global businesses demands continuous availability of database data. Database downtime affects performance of applications that may interact with database systems, as well as the human performance that depends on those database systems. For example, taking down database systems sustaining online banking web services will affect a user's ability to access their bank accounts and also affect customer service satisfaction. In fact, many database users have high availability requirements, such as 99.999% uptime (which means a maximum downtime per year of 5.26 minutes).

Database reconfiguration is one reason that database data becomes unavailable. During database reconfiguration, new lock requests are temporarily stalled, causing the users of the database to experience a brownout. Database reconfiguration can be required for many reasons, including a new server node joining a cluster of nodes, one or more servers of the cluster getting shut down for maintenance or due to software or hardware failures, etc.

Database reconfiguration is generally implemented by freezing access to the database and scanning every lock being maintained for the database (which may be on the order of a billion locks), since any one of the locks might be affected by the reconfiguration. Scanning every lock maintained for a database is time-consuming and, as such, database reconfiguration can bring a database offline for an unacceptable amount of time. Therefore, it would be beneficial to minimize the amount of time that is needed for database reconfiguration.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Each lock that governs access to resources on a multi-node system are represented by a lock structure maintained by the multi-node system. Further, each lock structure that protects resources being managed by a multi-node system is assigned a lock master node from among the nodes of the system. The lock master, for a particular lock structure, is the node within the system that manages data for the particular lock structure. The multi-node system maintains a master hash table that correlates lock structures with assigned lock masters. Thus, to identify the lock master for a particular lock structure, the multi-node system calculates a master hash index based on information for lock structure, where the master hash index uniquely identifies a bucket, in the master hash table, that includes information for the lock master of the particular lock structure.

The lock master node for a particular lock structure stores metadata for the lock structure within one or more local hash tables located on the node. According to one or more embodiments, the multi-node system stores information, for a particular lock structure within a particular bucket of a local hash table stored on a given lock master node, using a local (hybrid) hash index (which uniquely identifies the particular bucket in the local hash table) that includes the master hash index for that particular lock structure. In this way, the master hash index for a particular lock structure is coordinated with the local hash index for the lock structure.

As such, according to one or more embodiments, a multi-node system uses a hybrid hash index, a portion of which represents a corresponding master hash index, to index into both the master hash table and into a local hash table for a given lock. In this way, the hash index used to store lock metadata in a particular local hash table bucket, on a particular lock master, encodes the lock master index, for a master hash table, to which the locks in the local hash table bucket correspond.

According to one or more embodiments, reconfiguration of lock masters for a cluster of nodes is optimized using these coordinated hash indexes. As indicated above, since the locks mapped to a given bucket of the master hash table are stored, on the assigned lock master, relative to the index for the master hash table bucket, only the portions of the local hash table on the lock master that correspond to the index of the master hash table bucket need to be scanned in order to perform the needed tasks for lock master reconfiguration.

Furthermore, utilizing coordinated hash indexes for lock masters in the cluster of nodes yields a dramatic reduction in CPU cycles stalled due to CPU cache misses. This reduction in CPU cache misses is a result of having the lock reference information, for locks mapped to a given bucket in a master hash table, located only in particular portions of a local hash table. When the multi-node system must scan the lock reference information for locks mapped to a given master hash index, the multi-node system reads each lock metadata object (in the linked list for a particular bucket that maps to the master hash index in the local hash table) in the order that the objects are included in the linked list. Since the reads are contiguous, at any given time during the read, it is more likely that the data that is required for the next lock reference information object will be pre-fetched into cache memory because of the proximity (on disk) of the required data to other data that has been previously read from the local hash table.

Figure 1:
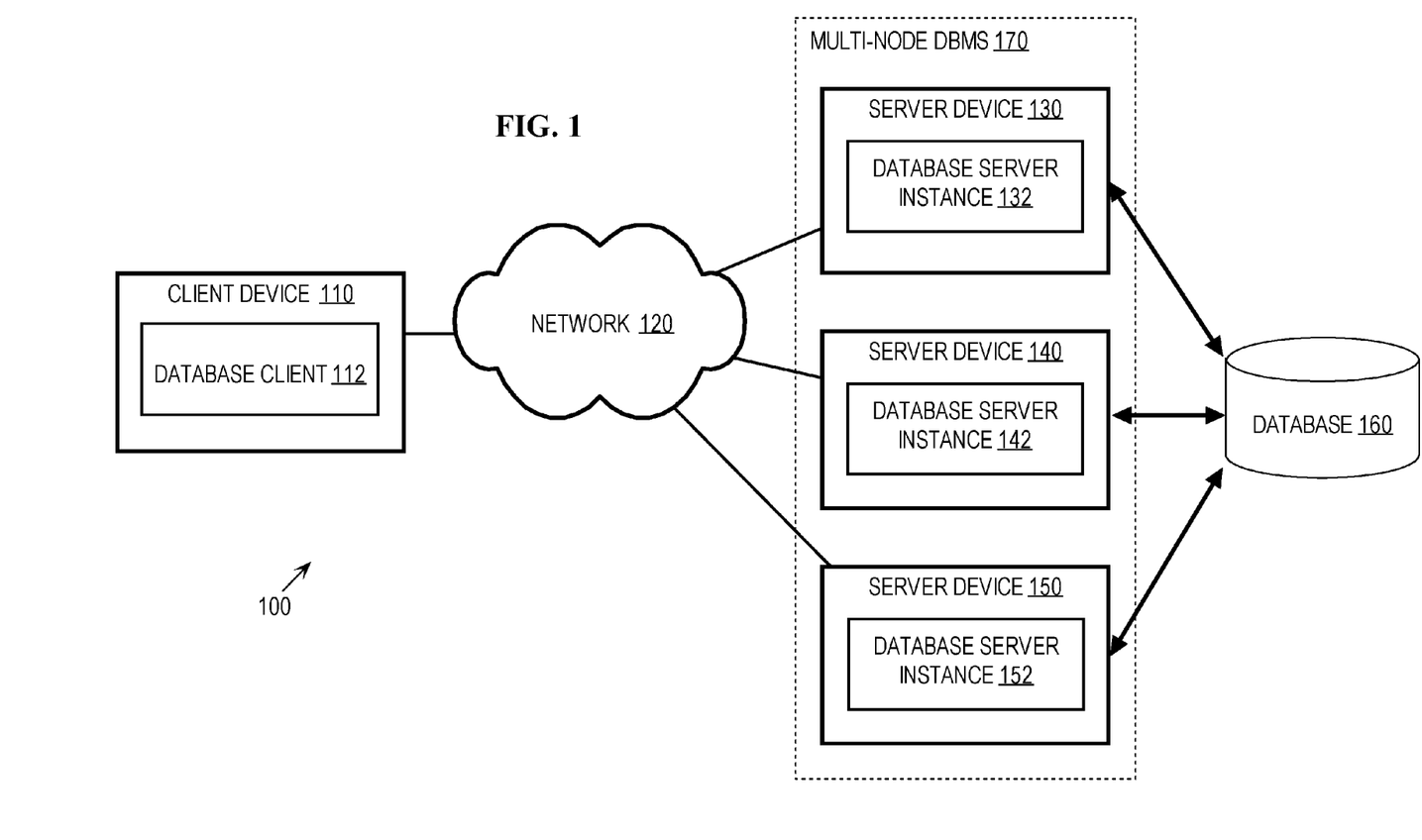
FIG. 1 is a block diagram that depicts an example network arrangement for coordinating hash indexes used to store lock master information for a node cluster.

Architecture for Coordinating Hash Indexes for Storing Lock Master Information for a Node Cluster FIG. 1 is a block diagram that depicts an example network arrangement 100 for coordinating hash indexes used to store lock master information for a node cluster, according to embodiments. Network arrangement 100 includes a client device 110 and server devices 130, 140, and 150 communicatively coupled via a network 120. Example network arrangement 100 may include other devices, including client devices, server devices, storage devices, and display devices, according to embodiments.

Client device 110 may be implemented by any type of computing device that is communicatively connected to network 120. Example implementations of client device 110 include, without limitation, workstations, personal computers, laptop computers, personal digital assistants (PDAs), tablet computers, cellular telephony devices such as smart phones, and any other type of computing device.

In network arrangement 100, client device 110 is configured with a database client 112. Database client 112 may be implemented in any number of ways, including as a standalone application running on client device 110, or as a plugin to a browser running at client device 110, etc. Database client 112 may be implemented by one or more logical modules. Client device 110 may be configured with other mechanisms, processes and functionalities, depending upon a particular implementation.

Network 120 may be implemented with any type of medium and/or mechanism that facilitates the exchange of information between client device 110 and any of server devices 130, 140, and 150. Furthermore, network 120 may facilitate use of any type of communications protocol, and may be secured or unsecured, depending upon the requirements of a particular embodiment.

Server devices 130, 140, and 150 are nodes in a multi-node system. In a multi-node system, nodes may appear as a single system to application servers and user applications. Each node may handle its share of the workload during the normal operation when all the nodes in the multi-node system supposed to be up are in fact up. When one of the nodes fails (or is out of service for whatever reason), a particular node may be required to take over some, or all, of the failed node's share of the workload. An example of a multi-node system is a multi-node DBMS, as described below. Embodiments are described in the context of a multi-node DBMS, but are not limited to a database management system.

According to embodiments, server devices 130, 140, and 150 are nodes in a cluster of nodes managed by a multi-node DBMS 170, e.g., as part of a shared-everything cluster database environment (such as Oracle Real Application Clusters ("RAC")). (See "Oracle Real Application Clusters (RAC)", An Oracle White Paper, June 2013, Oracle Database 12C documentation. This document is incorporated by reference as if fully set forth herein.)

According to embodiments, any number of nodes may be part of the node cluster managed by multi-node DBMS 170. Server devices 130, 140, and 150 are implemented by any type of computing device that is capable of communicating with client device 110 over network 120 and also capable of running a database server instance. Alternatively or additionally, one or more of server devices 130, 140, and 150 comprise the nodes of a grid, which is composed of nodes in the form of server blades interconnected with other server blades on a rack.

In network arrangement 100, server devices 130, 140, and 150 are configured with database server instances 132, 142, and 152, respectively. Database server instances 132, 142, and 152, installed on the nodes managed by multi-node DBMS 170, collectively implement the database server being managed by multi-node DBMS 170. Specifically, resources from multiple nodes in a multi-node database system can be allocated to run a particular database server's software.

A database server instance (or "instance") is a server that comprises a combination of the software and allocation of resources from a node. Specifically, a server, such as a database server, is a combination of integrated software components and an allocation of computational resources, such as memory, a node (i.e., a computing device), and/or processes on the node for executing the integrated software components on a processor, the combination of the software and computational resources being dedicated to performing a particular function on behalf of one or more clients (such as database client 112 on client device 110).

Database server instances 132, 142, and 152 share access to the same database (i.e., database 160). Specifically, according to embodiments, the all of the nodes of multi-node DBMS 170 (at least including server devices 130, 140, and 150) share access, potentially in varying degrees, to shared storage that stores the data for database 160. According to an embodiment, this shared access comprises access to a set of disk drives (accessible by the nodes of multi-node DBMS 170 or on one or more of the nodes) and to data blocks stored thereon. Database 160 may reside in any type of storage, including volatile and non-volatile storage, e.g., random access memory (RAM), one or more hard disks, main memory, etc.

One or more of the functions attributed to processes running on server device 130, 140, and/or 150, as described herein, may be performed by services on other server devices that are communicatively coupled to network 120. Furthermore, any of the functionality attributed to database client 112 and database server instances 132, 142, and 152 herein may be performed by any other logical entity of network arrangement 100, according to embodiments. Also, database server instances 132, 142, and 152 may each be implemented by one or more logical modules, and are described in further detail below. Server devices 130, 140, and 150 may be configured variously with other mechanisms, processes and functionalities, depending upon a particular implementation.

In an embodiment, each of the processes and/or functionality described in connection with database client 112, database server instances 132, 142, and 152, database 160, and/or DBMS 170 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Database Systems

Embodiments of the present invention are used in the context of database management systems. Therefore, a description of a DBMS is useful. A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users may interact with an instance of a database server of a DBMS by submitting, to the database server instance, commands that cause the database server instance to perform operations on data stored in a database. For example, a user at client device 110 submits, via database client 112, a database command to database server instance 132 with which database client 112 maintains a connection. A user may be one or more applications running on client device 110 that cause database client 112 to interact with database server instance 142. Multiple parties may access database resources through a given application. Multiple parties and/or users may also be referred to herein, collectively, as a user.

Data Locks

Computing resources for a cluster of nodes may be shared among the nodes of the cluster. Data blocks of a storage medium or tables stored on a storage medium may be concurrently accessed in some ways (e.g. read) by multiple processes, but accessed in other ways (e.g. written to) by only one process at a time. Consequently, mechanisms have been developed which control access to resources.

One such mechanism is referred to as a lock. A lock is a data structure that includes metadata identifying a particular resource, a particular process, and what particular rights have been granted to that process for the resource. There are many types of locks. Some types of locks may be shared by many processes, while other types of locks prevent any other locks to be granted on the same resource.

At the lowest level in the hierarchy is a NULL mode lock. Ownership of a NULL mode lock on a table grants a process no permission to access the table in any manner. Ownership of a concurrent read lock grants a process permission to read the table, but does not guarantee that other processes are not concurrently writing to the table. Ownership of a protected read lock grants a process permission to read the table and guarantees that no other process is concurrently writing to the table. Ownership of a concurrent write lock grants a process permission to write to the table, but does not guarantee that another process is not also writing to the table. Ownership of a protected write lock grants a process permission to write to the table and guarantees that another process is not also writing to the table. Ownership of an exclusive mode lock grants a process permission to do anything with a table, and guarantees that no other process is performing any operation on the table.

Distributed Lock Manager

Before a process can perform an operation on a resource, the process is required to obtain a lock that grants, to the process, the right to perform the desired operation on the resource. To obtain a lock, a process transmits a request for the lock to a lock manager process. A lock manager is a process that is responsible for granting, queuing, and keeping track of locks on one or more resources. To manage the use of resources in a network system, lock manager processes are executed on one or more nodes in a given cluster of nodes. According to one or more embodiments, a lock manager is a layer of software that any local process, running on a node of the cluster, executes to get a lock on a particular resource in a database.

According to one or more embodiments, multi-node DBMS 170 implements one or more distributed lock manager (DLM) process, which maintain a list of system resources and provides locking mechanisms to control allocation and modification of resources across the multiple nodes of the cluster. Every process, operating within the cluster of nodes, that requires access to a database resource protected by the DLM must open a lock on the resource. (See Distributed Lock Manager: Access to Resources, Oracle? Parallel Server Concepts and Administrator's Guide, found, at the time of writing, as "chap8.htm" at "docs.oracle.com/cd/A57673_01/DOC/server/doc/SPS73". This document is hereby incorporated by reference, as if fully set forth herein.)

Figure 2:
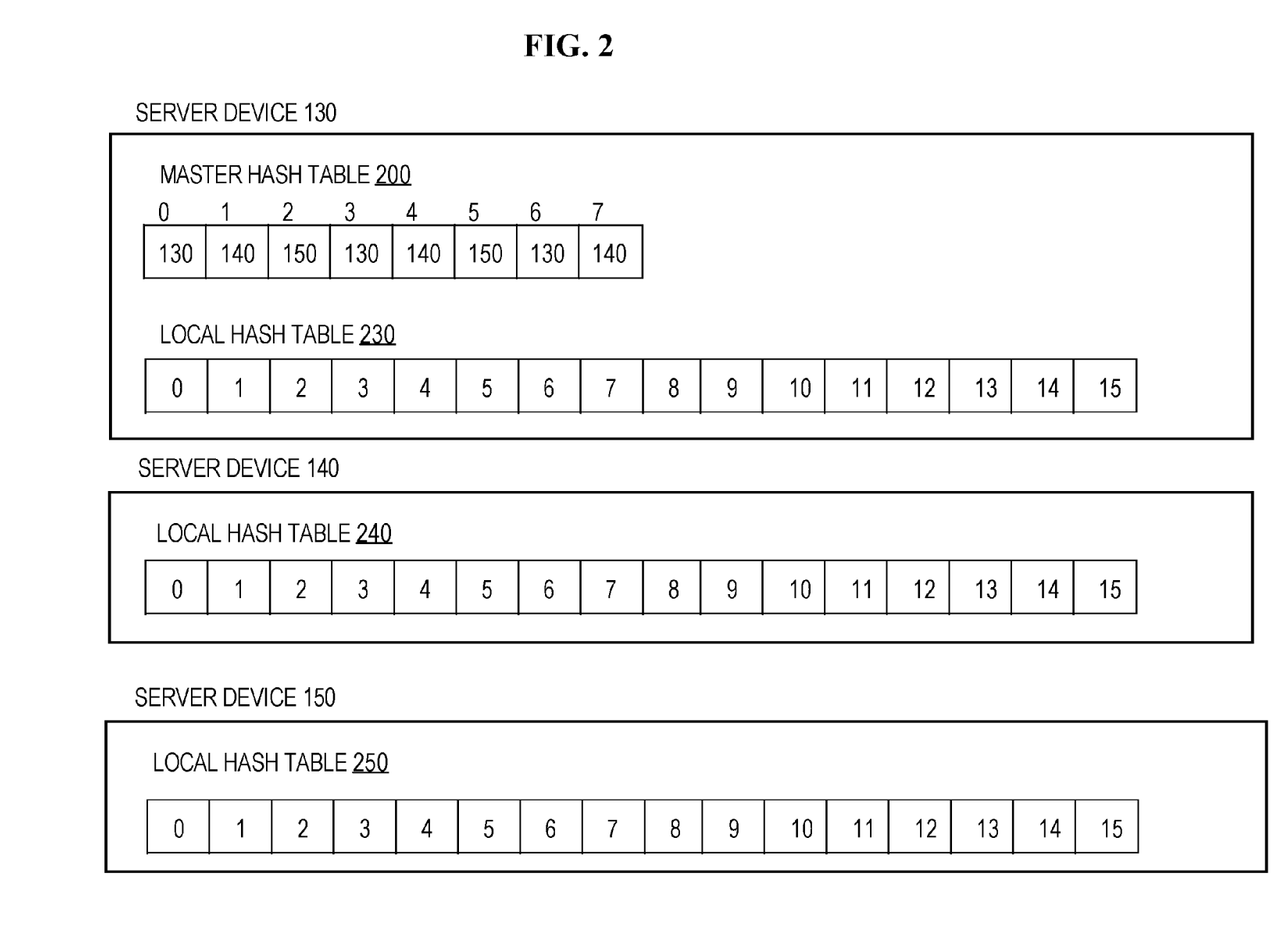
FIG. 2 depicts a master hash table and local hash tables, maintained by nodes in a cluster of nodes, to manage lock mastership for locks on resources in a given database.

As such, using DLM, multi-node DBMS 170 coordinates concurrent access to resources, such as data blocks and rollback segments, across the multiple instances within the cluster of nodes (i.e., database server instances 132, 142, and 152). FIG. 2 depicts a master hash table 200 and local hash tables 230, 240, and 250, maintained, respectively, by database server instances 132, 142, and 152 within memory of the respective nodes, to manage lock mastership for locks on resources in database 160 and distribute lock mastership among the nodes of the cluster. As depicted in FIG. 2, server device 130 maintains, in memory, a master hash table 200 that tracks the lock masters for locks on resources managed by multi-node DBMS 170. While master hash table 200 is depicted only on server device 130, according to one or more embodiments, one or more other server devices in the cluster of nodes also maintain copies of master hash table 200.

A lock maintained by a multi-node system is associated with a resource, of the multi-node system, over which the lock governs access. A lock is associated with a lock identifier that uniquely identifies the lock, which may be distinct from an identifier of the resource that the lock governs, or may be the same as the identifier of the governed resource. For example, a particular lock governs access to a particular data block the lock identifier associated with the lock is the resource identifier, or data block address (DBA), for the governed resource.

A lock identifier associated with a given lock, and that uniquely identifies the given lock, is hashed to generate a master hash index that indexes into master hash table 200 (which, as depicted in FIG. 2, has a 0-based array index).

Each hash bucket in master hash table 200 stores an identifier of the node, in the cluster, that serves as the lock master for the locks that hash to that bucket. For example, the lock identifier associated with a particular lock hashes to a master hash index '6'. The node that is identified in cell index '6' of master hash table 200, i.e., server device 130, is the lock master for that lock.

The lock master node, for a given lock, stores metadata of the lock in a local hash table stored in memory of the node. For example, as depicted in FIG. 2, instances 132, 142, and 152 store, in memory, local hash tables 230, 240, and 250, respectively. Locks that are assigned to a given lock master node are stored within the appropriate local hash table by hashing the lock identifier that uniquely identifies the lock, to produce a hybrid hash index (as described in further detail below), and storing the lock into the bucket that corresponds to the hybrid hash index, e.g., by adding an object that contains the lock metadata to a linked list of lock objects stored in the bucket.

Managing Locks Using Coordinated Hash Indexes

Figure 3:
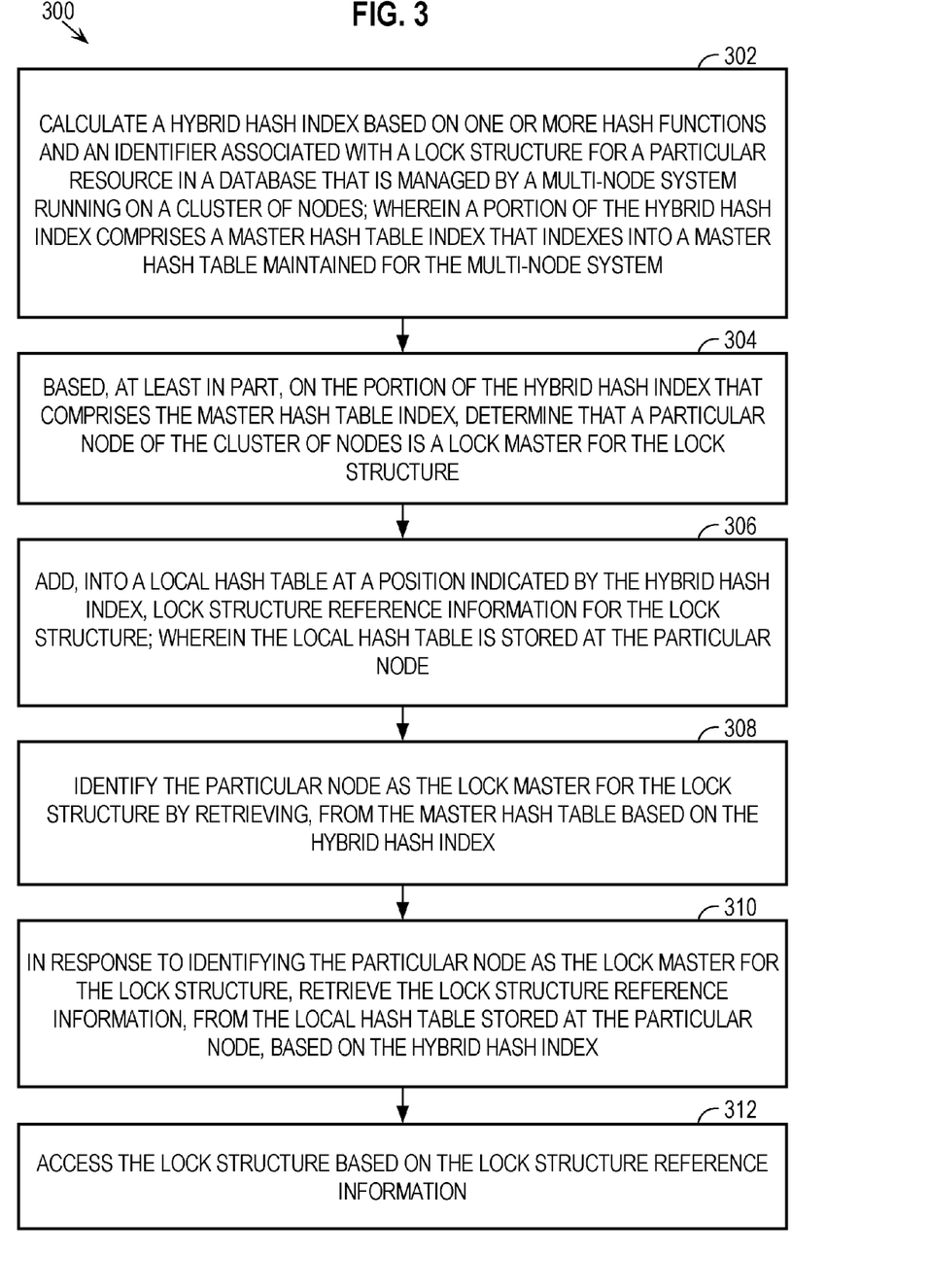
FIG. 3 depicts a flowchart for using a hybrid hash index, a portion of which represents a corresponding master hash index, to index into both the master hash table and into a local hash table for a given lock.

According to embodiments, reconfiguration of lock masters for a cluster of nodes is optimized using coordinated hash indexes to index into the master hash table and into local hash tables stored on the nodes of the cluster. FIG. 3 depicts a flowchart 300 for using a hybrid hash index, a portion of which represents a corresponding master hash index, to index into both the master hash table and into a local hash table for a given lock.

At step 302, a hybrid hash index is calculated based on one or more hash functions and an identifier of a lock structure for a particular resource in a database that is managed by a multi-node system running on a cluster of nodes, where a portion of the hybrid hash index comprises a master hash table index that indexes into a master hash table maintained for the multi-node system. For example, a particular process executing on a particular node, e.g., server device 130, requests, from a lock manager for database server instance 132, a particular type of lock on a particular block of data in database 160. In response to the request, the lock manager records information for the requested lock.

If the lock manager is not able to obtain the requested lock on the resource at the time of the request, the lock manager places the lock request information in a wait list. Once the particular block of data is subject to no other lock that precludes the requested type of lock, the lock manager removes the lock information from the wait list and obtains the lock on the particular block of data for the particular process and, also, records the lock information in a lock structure.

In this way, DBMS 170 creates a new lock on a resource (i.e., the particular block of data) for database 160. DBMS 170 calculates a hybrid hash index for the new lock based on a unique identifier of the lock, where a portion of the hybrid hash index comprises a master hash index, into master hash table 200, for the lock.

For purposes of explanation, master hash table 200 has eight buckets, the indexes to which (0-7) are representable using three bits. According to embodiments, a master hash table may have any number of buckets. Also, for purposes of explanation, each of the local hash tables 230, 240, and 250 have 16 buckets. However, according to one or more embodiments of the invention, local hash tables maintained by lock masters within a cluster of nodes may be of any size, and the sizes of local hash tables may vary among the nodes of a cluster.

According to an embodiment, DBMS 170 calculates a hybrid hash index for the new lock using a single hash function. For example, DBMS 170 runs a unique identifier (e.g., '95645') of the lock through a hash function that results in a hybrid hash index that has four bits, a non-limiting illustration of which is: (the sum of each digit of the unique identifier) mod 16. Thus, given the example unique lock identifier "95645", the hybrid hash index is (9+5+6+ 4+5, or 29, mod 16 and 29 mod 16=13) '13' in decimal, which is represented by the following four binary bits: 0b1101. The top three bits of these four bits of the hybrid hash index are defined to represent the master hash index for the lock, i.e., 0b110.

At step 304, based, at least in part, on the portion of the hybrid hash index that comprises the master hash table index, it is determined that a particular node of the cluster of nodes is a lock master for the lock structure. Continuing with the example above, DBMS 170 identifies the lock master for the newly added lock by identifying the three high-order bits of the hybrid hash index of the lock, which is '13', where the high three bits that represent the master hash index is 0b110, or '6' in decimal. DBMS 170 determines, from the content of master hash table 200 at index '6' (i.e., the masters hash index from the hybrid hash index for the lock), that the lock master for the lock is server device 130.

At step 306, lock structure reference information for the lock structure is added into a local hash table at a position indicated by the hybrid hash index, where the local hash table is stored at the particular node. For example, in response to identifying server device 130 as the lock master for the newly created lock, DBMS 170 stores lock reference information, for the lock, into a bucket of local hash table 230 at index '13', which is the hybrid hash index for the lock. Specifically, according to one or more embodiments, DBMS 170 adds an object that contains the lock metadata (including the unique identifier of the lock) to a linked list of lock metadata objects stored in the bucket at index '13' of local hash table 230.

According to one or more embodiments, steps 308-312 of flowchart 300 are performed after adding the lock structure reference information to the local hash table. Specifically, after the lock structure reference information is added to the local hash table, the database management system detects a need to access the lock structure. For example, DBMS 170 requires access to the lock structure in order to release the lock represented by the lock structure. At steps 308-312, the lock structure reference information is accessed using the hybrid hash index.

At step 308, the particular node is identified as the lock master for the lock structure by retrieving, from the master hash table based on the hybrid hash index, identifying information for the particular node. As a non-limiting example, DBMS 170 requires access to the lock structure in the above example in order to release the lock represented by the lock structure. In order to access the lock structure, DBMS 170 retrieves the lock reference information for the lock.

In order to retrieve the lock reference information for the lock in question, DBMS 170 runs the lock identifier associated with the lock, "95645", through the hybrid hashing function to produce the hybrid hash index '13'. DBMS 170 uses the three high-order bits from the hybrid hash index, or 0b110 to determine the bucket, in master hash table 200, to which the lock corresponds. In the bucket indexed by 0b110, or index '6', information identifying server device 130 is stored, which identifies server device 130 as the lock master for the lock.

At step 310, in response to identifying the particular node as the lock master for the lock structure, the lock structure reference information is retrieved, from the local hash table stored at the particular node, based on the hybrid hash index. Continuing with the above example, the hybrid hash index calculated based on the lock identifier ("95645") associated with the lock that is being accessed is '13'. As such, DBMS 170 retrieves, from bucket index '13' of local hash table 230 on server device 130, which is the lock master for the lock, lock structure reference information stored for the lock. To illustrate, database server instance 132 searches for a lock metadata object, in the linked list stored at bucket '13' within local hash table 230, that includes metadata indicating a unique identifier of "95645", matching the identifier of the lock, and instance 132 retrieves the metadata stored in that object.

At step 312, the lock structure is accessed based on the lock structure reference information. For example, the metadata stored in the identified lock metadata object refers to a location at which the lock is stored. DBMS 170 accesses the lock based on the information, in the retrieved metadata, that indicates the location of the lock structure for the lock.

Alternate Embodiments of Hash Functions

According to another embodiment, DBMS 170 calculates the hybrid hash index for the lock by running the lock identifier through multiple hash functions and concatenating binary results from the hash functions to generate the hybrid hash index. For example, DBMS 170 calculates a master hash index based on a master hash function and calculates a local component for the hybrid hash index based on a local hash function. The local hash function is illustrated herein as the same for all nodes in the cluster, but, according to one or more embodiments, the local hash function is specific to the lock master to which the lock is assigned. Local hash functions that differ among the nodes of a cluster facilitates differences in local hash table size among the nodes. Furthermore, the local component that is used in the hybrid hash index for a given lock may have any number of bits.

To illustrate this embodiment, DBMS 170 calculates the master hash index for the lock (id "95645") based on a master hash function (e.g., multiply the first two digits of the identifier; multiply the last three digits of the identifier; add the two resulting quantities; and mod the resulting sum by 8). Thus, according to the example, the master hash index is calculated to be '5' (i.e., 9×5+6×4×5, or 165; and 165 mod 8=5), or 0b101. Furthermore, DBMS 170 calculates a local hash index component for the lock (id "95645") based on a local hash function (e.g., multiply the first two digits of the identifier; multiply the last three digits of the identifier; add the two resulting quantities; and mod the resulting sum by 2). Thus, according to the example, the local hash index component for the lock is calculated to be '1' (i.e., 9×5+6× 4×5=165; and 165 mod 2=1), or 0b1. The hybrid hash index based on concatenating the binary results of these two hash functions is 0b101 & 0b1=0b1011, or decimal '11'.

The hash functions depicted above are non-limiting examples, and embodiments include other hash functions. For example, DBMS 170 uses a local hashing function that generates a 64-bit hash value, where a given number of the resulting bits comprises the local hash index component of the hybrid hash index for a particular lock mapped to a particular lock master node. The number of bits used for the local hash index component depends on the number of buckets in a given local hash table. According to one or more embodiments, every k consecutive lock identifiers generate the same local bucket id to improve locality.

According to embodiments, a hybrid hash index includes results from additional hash functions, in addition to a master hash function and/or a local hash function. For example, according to one embodiment, a hybrid hash index includes the results of an LMS (lock manager server) hashing function, where the unique lock identifier is used to generate an LMS id between [0, n−1], where n is the number of the LMS processes, and where every m consecutive lock names generate the same LMS id to improve locality. In this example, the components of a given hybrid hash index is as follows: |LMS id| master hash index local hash index component |. To illustrate, for a given lock, if the LMS id is 0x10, the master hash identifier is 0x80, and the local hash index component is 0x1234, the hybrid hash index is 0x10801234.

Distributed Lock Management Reconfiguration

Upon detection of certain conditions, access to database resources is interrupted in order to reconfigure the lock masters for multi-node DBMS 170. Conditions which require reconfiguration of lock masters include: a hardware or software issue that causes a node of the cluster to go down, required maintenance for a node of the cluster, a software/hardware upgrade for a node of the cluster, or any other condition that requires a node to go offline or requires a node (having previously been offline or being new to the cluster) to come online. When a condition that precipitates reconfiguring the lock masters for multi-node DBMS 170 is detected, DBMS 170 reconfigures the locks, e.g., by reassigning locks among the nodes managed by DBMS 170 in order to balance lock management among the nodes of the cluster, and/or by performing one or more of a clean-up step, replay step or fix write step described in further detail below.

Figure 4:
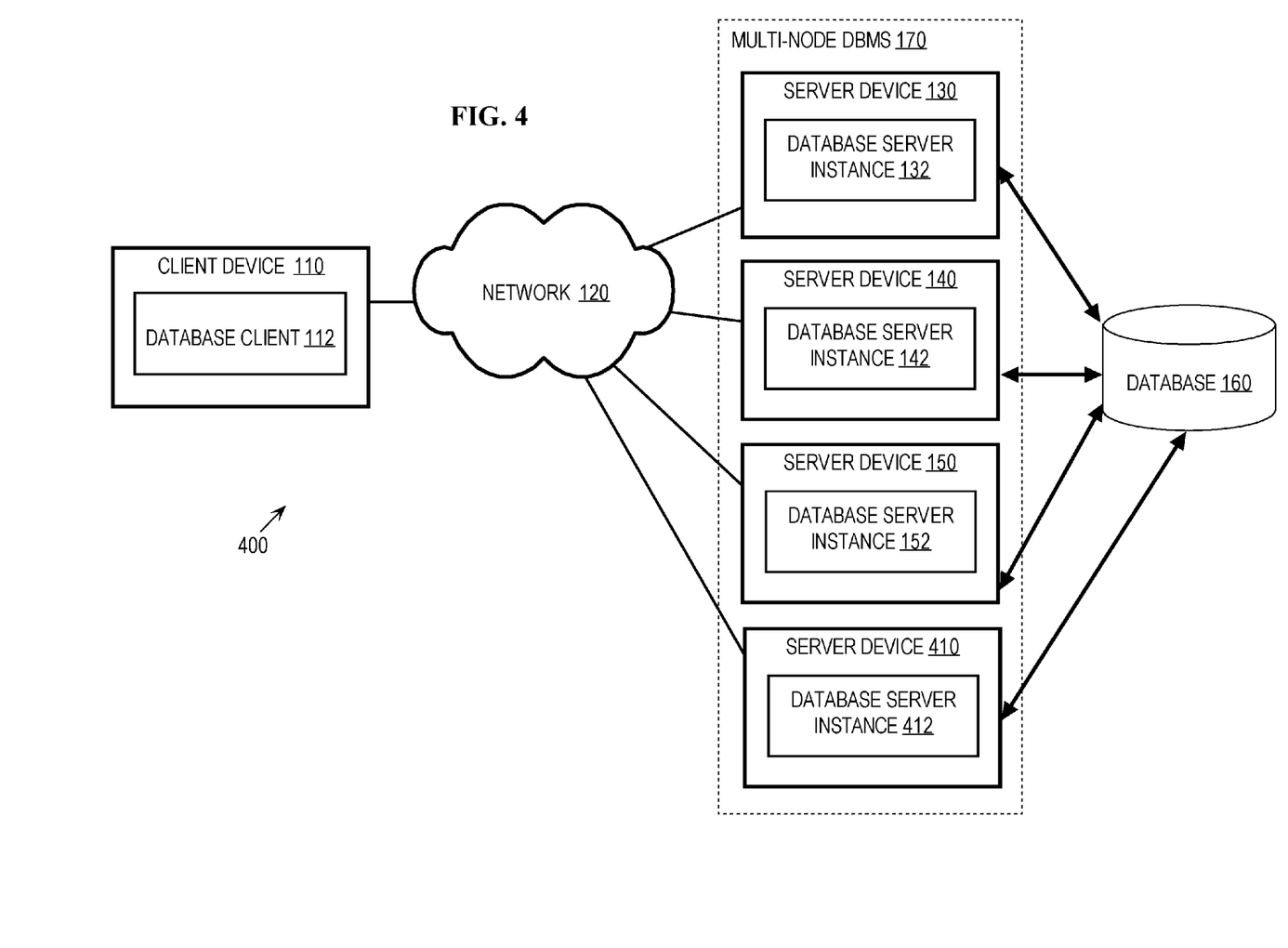
FIG. 4 depicts an example network arrangement in which a new server device is added to the cluster of nodes managed by a multi-node DBMS.

For example, as depicted in example network arrangement 400 of FIG. 4, which network arrangement is similar to network arrangement 100, a new server device 410 is added to the cluster of nodes managed by DBMS 170. This addition of a new server device is a condition for reconfiguring the lock masters for DBMS 170.

Figure 5:
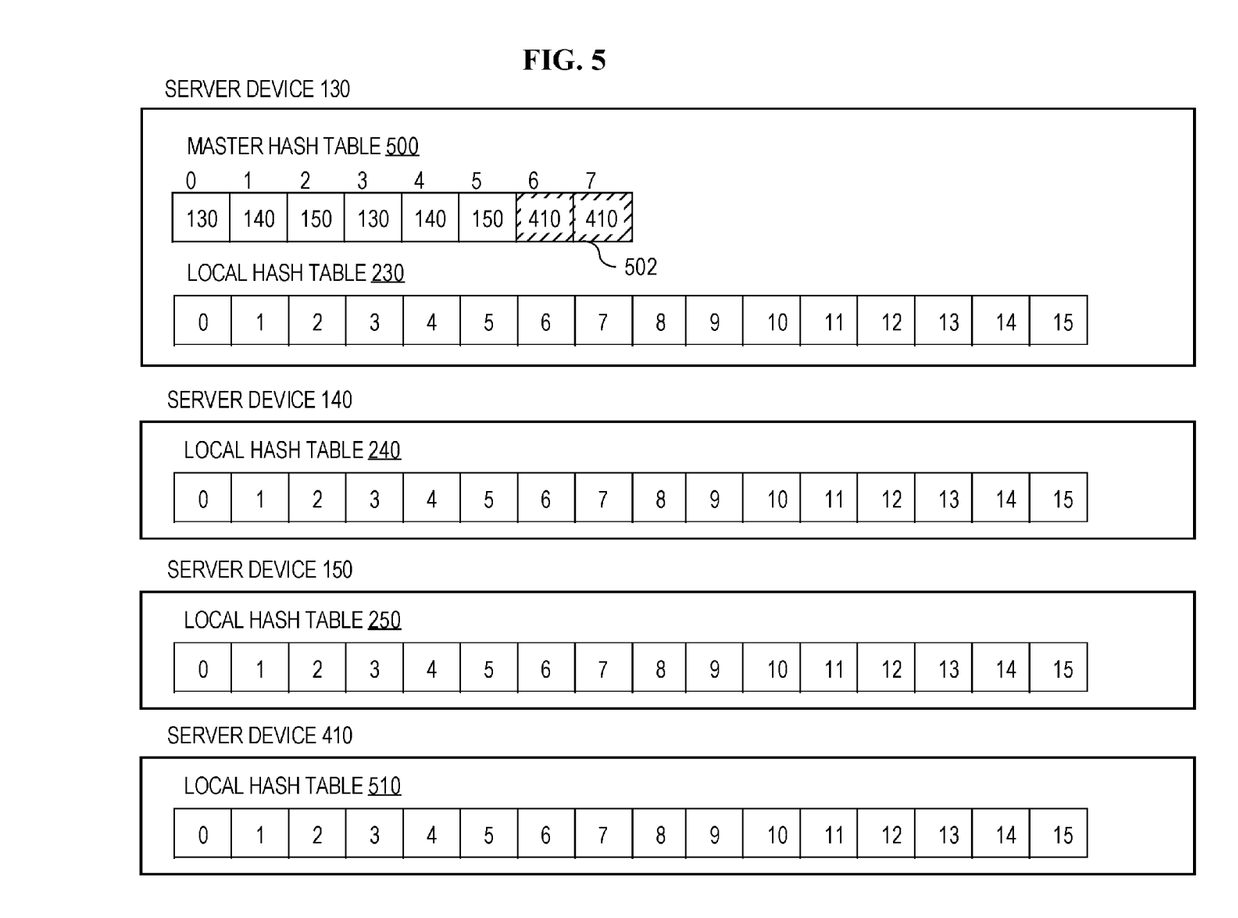
FIG. 5 depicts an adjusted master hash table and a local hash table on a node that is newly added to a cluster of nodes.

In response to detecting addition of server device 410, DBMS 170 reassigns the lock master node, assigned to one or more of the cells in the master hash table for the cluster, to be server device 410. For example, FIG. 5 depicts an adjusted master hash table 500, in which DBMS 170 has reassigned lock mastership for buckets indexed 6 and 7 to server device 410. This reassignment re-allocates lock mastership of one-fourth of the locks to the newly added server device 410 and balances the lock mastership load among the four nodes in the cluster. This re-allocation is a non-limiting example, and, within one or more embodiments, DBMS 170 may use any algorithm to reassign lock mastership among the nodes of a cluster.

As a result of DBMS 170 re-allocating lock mastership, the locks that hash to master hash index 6 are reassigned from lock mastership by server device 130 to lock mastership by server device 410; also the locks that hash to master hash index 7 are reassigned from lock mastership by server device 140 to lock mastership by server device 410. As an illustrative example, reassignment of locks mastership from server device 130 to server device 410 is described in detail below.

Reassigning the set of locks mapped to master hash index '6' comprises identifying a set of hash buckets, in local hash table 230 on server device 130 (the previous lock master for master hash index '6'), that are indexed by hybrid hash indexes whose high bits are the set of bits that represent master hash index '6'. Specifically, DBMS 170 identifies the set of buckets, from local hash table 230, that have the high bits 0b110, i.e., local hash table 230 buckets with index 0b1100 (or '12') and index 0b1101 (or '13'). The buckets in local hash table 230 that are indexed by hybrid hash indexes '12' and '13' are the buckets in which all (and only) lock reference information, for locks that map to master hash index '6', is stored.

In response to identifying the set of hash buckets in local hash table 230 that store lock reference information for master hash index '6', DBMS 170 stores lock structure reference information, from the set of hash buckets, in a second local hash table on server device 410. Specifically, to effectuate remastering the locks mapped to master hash bucket '6', DBMS 170 stores, in local hash table 510 maintained by database server instance 412 on server device 410, the lock reference information that was stored in buckets '12' and '13' in local hash table 230.

More specifically, database server instance 132 sends, to database server instance 412, a message with the lock reference information that was stored in buckets '12' and '13' of local hash table 230. The message has the information that database server instance 412 needs to reconstruct the state for the lock reference information for storage within local hash table 510. Database server instance 412 receives the message from database server instance 132, and, in response, reconstructs the state for the locks represented in the received lock reference information.

Database server instance 412 stores the reconstructed locks to local hash table 510. To store the information, database server instance 412 generates a hybrid hash index (as described above) for each lock identifier associated with the locks that were described in the message from database server instance 132. Since these locks are mapped to master hash bucket '6', the hybrid hash index for each lock has the high bits 0b110 that represent the master hash bucket to which the locks map. Database server instance 412 stores each lock in the local hash bucket that is identified by the hybrid hash index for the lock. In the example depicted in FIG. 5, these locks will map to one of buckets '12' and '13' of local hash table 510, since these buckets have the high bits 0b110.

Selective Lock Scanning

As indicated above, since the locks mapped to a given bucket of the master hash table are stored, on the assigned lock master, relative to the index for the master hash table bucket, only the portions of the local hash table on the lock master that correspond to the index of the master hash table bucket need to be scanned in order to perform the needed tasks for lock master reconfiguration. In the absence of a hybrid hash index that is coordinated with the appropriate master hash table index, lock structure information may be stored in any portion of a local hash table of a lock master node. As such, the database management system would be required to scan the entire local hash table of a node that is being reconfigured in order to identify those locks that need to be moved to a new lock master node.

Thus, according to one or more embodiments, storing lock structure information into local hash tables using hybrid indexes streamlines the process of scanning the local hash tables in connection with lock master reconfiguration. In the context of the above example, database server instance 132 was only required to send data, from local hash table 230, located in buckets '12' and '13', since those are the only two buckets that map to the master hash table bucket for which lock mastership was reassigned. No other local hash table buckets need be scanned for data to send to the new lock master.

Furthermore, application of coordinated hash indexes (as described above) yields efficiency gains in the following steps of reconfiguration: a clean-up step, a replay step, and a fix write step. A clean-up step is required when reconfiguration is precipitated by a node in the cluster going down while data, subject to locks owned by processes on the failed node, is in an inconsistent state. During the clean-up step of reconfiguration, DBMS 170 scans locks within a local hash table of a particular node, where the locks have been reassigned to the particular node, to clean up any locks belonging to the old master. DBMS 170 only scans those buckets, in the local hash table, that correspond to master hash indexes that are affected by this reconfiguration, and all other buckets of the local hash table that have high bits corresponding to other master hash indexes (not affected by the reconfiguration) are not scanned by DBMS 170 in connection with this step.

During the replay step of reconfiguration, DBMS 170 sends a lock replay message, for every lock whose master has changed, to the new master. The LMS (lock manager server) process will process the replayed locks and insert them into the appropriate local hash table (as described above).

A buffer may need to be written to disk when, for example, a node of the multi-node system crashes while in the process of writing to disk a data block that is stored in the buffer. When such a data block write operation has been initiated, a header in the data block being written to disk is marked to specify that the write operation has been initiated. When the data block write operation is completed, the marking in the header of the data block is removed to specify that the data block write operation is completed. As such, a data block with a marked header indicates that the data block write operation was initiated and not completed.

During the fix write step of reconfiguration, DBMS 170 scans the headers of data blocks associated with locks within a local hash table of a new lock master node, where the locks have been reassigned to the new lock master node, to check if the header of the data block is still marked for a data block write operation. If the header is marked, then the buffer cache that stores the data block associated with the lock should be written to disk to ensure that all initiated write operations have resulted in a consistent state. If some buckets of the master hash table are not affected by this reconfiguration (for example, there is a new node joining the cluster as described above), then the buckets in the local hash table that map to unaffected master hash table buckets are not scanned by DBMS 170 in connection with this reconfiguration step.

Contiguous Lock Read and Write

According to an embodiment, utilizing coordinated hash indexes for lock masters in the cluster of nodes yields a dramatic reduction in CPU cycles stalled due to CPU cache misses. This reduction in CPU cache misses is a result of having the lock reference information, for locks mapped to a given bucket in master hash table 200, located only in particular portions of a local hash table.

All of the lock reference information in a given bucket of a local hash table is mapped to the same bucket in master hash table 200. Thus, when DBMS 170 must scan the lock reference information for locks mapped to a given master hash index, DBMS 170 reads each lock metadata object (in the linked list for a particular bucket that maps to the master hash index in the local hash table) in the order that the objects are included in the linked list. Since the reads are contiguous, at any given time during the read, it is more likely that the data that is required for the next lock reference information object will be pre-fetched into cache memory because of the proximity (on disk) of the required data to other data that has been previously read from the local hash table.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
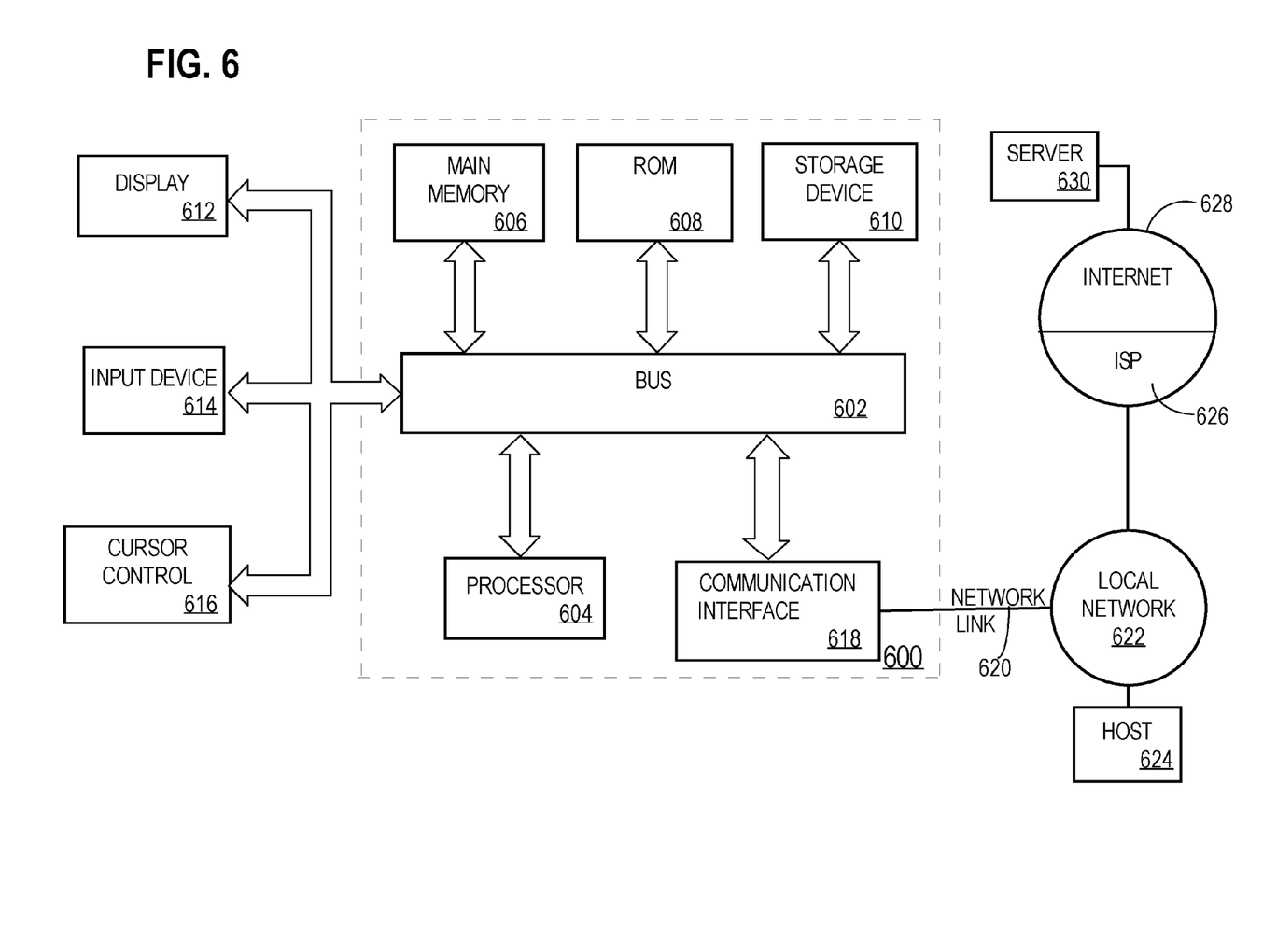
FIG. 6 is a block diagram of a computer system on which embodiments may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    calculating a hybrid hash index based on one or more hash functions and an identifier associated with a lock structure for a particular resource in a database that is managed by a multi-node system running on a cluster of nodes;
    wherein a portion of the hybrid hash index comprises a master hash table index that indexes into a master hash table maintained for the multi-node system;
    based, at least in part, on the portion of the hybrid hash index that comprises the master hash table index, determining that a particular node of the cluster of nodes is a lock master for the lock structure;
    adding, into a local hash table at a position indicated by the hybrid hash index, lock structure reference information for the lock structure;
    wherein the local hash table is stored at the particular node; and
    after adding the lock structure reference information to the local hash table:
        identifying the particular node as the lock master for the lock structure by retrieving, from the master hash table based on the hybrid hash index, identifying information for the particular node;
        in response to identifying the particular node as the lock master for the lock structure, retrieving the lock structure reference information, from the local hash table stored at the particular node, based on the hybrid hash index; and
        accessing the lock structure based on the lock structure reference information;
    detecting a condition that requires reconfiguring lock masters for the cluster of nodes;
    in response to detecting the condition that requires reconfiguring lock masters for the cluster of nodes:
        reassigning an assigned lock master, for a set of lock structures that are mapped to a particular bucket of the master hash table, from a first node of the cluster of nodes to a second node of the cluster of nodes;
        wherein the particular bucket is indexed, within the master hash table, by a particular index number represented by a set of bits;
        wherein reassigning the set of lock structures comprises:
            identifying a set of hash buckets, in a first local hash table on the first node, that are indexed by hash indexes whose high bits are the set of bits that represent the particular index number;
            in response to identifying the set of hash buckets: storing lock structure reference information, from the set of hash buckets, in a second local hash table on the second node;
    wherein the method is performed by one or more computing devices.

2. The method of claim 1, wherein calculating the hybrid hash index comprises calculating the hybrid hash index based on a single hybrid hash function.

3. The method of claim 1, wherein calculating the hybrid hash index comprises:
    calculating a master hash index, based on the identifier associated with the lock structure and a master hash function of the one or more hash functions, that indexes into the master hash table;
    calculating a local component number based on the identifier associated with the lock structure and a second hash function of the one or more hash functions;
    concatenating the master hash index and at least a portion of the local component number to generate the hybrid hash index.

4. The method of claim 3, wherein retrieving, from the master hash table based on the hybrid hash index, the identifying information for the particular node comprises retrieving the identifying information for the particular node, from the master hash table, using the master hash index as an index into the master hash table.

5. The method of claim 3, wherein retrieving the lock structure reference information, from the local hash table stored at the particular node, based on the hybrid hash index comprises retrieving the lock structure reference information, from the local hash table, using the hybrid hash index as an index into the local hash table.

6. The method of claim 1, wherein storing lock structure reference information, from the set of hash buckets, in the second local hash table on the second node comprises storing the lock structure reference information at hash indexes, that index into the second local hash table, that have high bits that are the set of bits that represent the particular index number.

7. The method of claim 1, wherein the particular resource is a particular block of data.

8. The method of claim 1, wherein the multi-node system is a distributed database management system.

9. One or more non-transitory computer-readable media storing one or more sequences of instructions which, when executed by one or more processors, cause:
    calculating a hybrid hash index based on one or more hash functions and an identifier associated with a lock structure for a particular resource in a database that is managed by a multi-node system running on a cluster of nodes;
    wherein a portion of the hybrid hash index comprises a master hash table index that indexes into a master hash table maintained for the multi-node system;
    based, at least in part, on the portion of the hybrid hash index that comprises the master hash table index, determining that a particular node of the cluster of nodes is a lock master for the lock structure;

adding, into a local hash table at a position indicated by the hybrid hash index, lock structure reference information for the lock structure;

wherein the local hash table is stored at the particular node; and after adding the lock structure reference information to the local hash table:
identifying the particular node as the lock master for the lock structure by retrieving, from the master hash table based on the hybrid hash index, identifying information for the particular node;
in response to identifying the particular node as the lock master for the lock structure, retrieving the lock structure reference information, from the local hash table stored at the particular node, based on the hybrid hash index; and
accessing the lock structure based on the lock structure reference information;

detecting a condition that requires reconfiguring lock masters for the cluster of nodes;

in response to detecting the condition that requires reconfiguring lock masters for the cluster of nodes:
reassigning an assigned lock master, for a set of lock structures that are mapped to a particular bucket of the master hash table, from a first node of the cluster of nodes to a second node of the cluster of nodes;
wherein the particular bucket is indexed, within the master hash table, by a particular index number represented by a set of bits;
wherein reassigning the set of lock structures comprises:
identifying a set of hash buckets, in a first local hash table on the first node, that are indexed by hash indexes whose high bits are the set of bits that represent the particular index number;
in response to identifying the set of hash buckets: storing lock structure reference information, from the set of hash buckets, in a second local hash table on the second node.

10. The one or more non-transitory computer-readable media of claim 9, wherein calculating the hybrid hash index comprises calculating the hybrid hash index based on a single hybrid hash function.

11. The one or more non-transitory computer-readable media of claim 9, wherein calculating the hybrid hash index comprises:
calculating a master hash index, based on the identifier associated with the lock structure and a master hash function of the one or more hash functions, that indexes into the master hash table;
calculating a local component number based on the identifier associated with the lock structure and a second hash function of the one or more hash functions;
concatenating the master hash index and at least a portion of the local component number to generate the hybrid hash index.

12. The one or more non-transitory computer-readable media of claim 11, wherein retrieving, from the master hash table based on the hybrid hash index, the identifying information for the particular node comprises retrieving the identifying information for the particular node, from the master hash table, using the master hash index as an index into the master hash table.

13. The one or more non-transitory computer-readable media of claim 11, wherein retrieving the lock structure reference information, from the local hash table stored at the particular node, based on the hybrid hash index comprises retrieving the lock structure reference information, from the local hash table, using the hybrid hash index as an index into the local hash table.

14. The one or more non-transitory computer-readable media of claim 9, wherein storing lock structure reference information, from the set of hash buckets, in the second local hash table on the second node comprises storing the lock structure reference information at hash indexes, that index into the second local hash table, that have high bits that are the set of bits that represent the particular index number.

15. The one or more non-transitory computer-readable media of claim 9, wherein the particular resource is a particular block of data.

16. The one or more non-transitory computer-readable media of claim 9, wherein the multi-node system is a distributed database management system.

\* \* \* \* \*

UNITED STATES PATENT AND TRADEMARK OFFICE
CERTIFICATE OF CORRECTION

PATENT NO. : 10,296,498 B2
APPLICATION NO. : 15/245005
DATED : May 21, 2019
INVENTOR(S) : Yang et al.

Page 1 of 1

It is certified that error appears in the above-identified patent and that said Letters Patent is hereby corrected as shown below:

In the Specification

In Column 6, Line 61, delete "block" and insert -- block; --, therefor.

Signed and Sealed this
Ninth Day of March, 2021

Drew Hirshfeld
*Performing the Functions and Duties of the
Under Secretary of Commerce for Intellectual Property and
Director of the United States Patent and Trademark Office*